(12) United States Patent
Lazarev et al.

(10) Patent No.: US 11,613,614 B2
(45) Date of Patent: Mar. 28, 2023

(54) LAZAREV REACTOR 1 : PRODUCTION OF FILMS OF TWO-DIMENSIONAL POLYMERS

(71) Applicant: 86 Solar Inc., Palo Alto, CA (US)

(72) Inventors: Pavel Ivan Lazarev, San Mateo, CA (US); Alexander P. Lazarev, Irvine, CA (US)

(73) Assignee: 86 SOLAR INC., Palo Alto, CA (US)

( * ) Notice: Subject to any disclaimer, the term of this patent is extended or adjusted under 35 U.S.C. 154(b) by 318 days.

(21) Appl. No.: 16/823,812

(22) Filed: Mar. 19, 2020

(65) Prior Publication Data

US 2021/0292493 A1    Sep. 23, 2021

(51) Int. Cl.
  *C08J 5/18*    (2006.01)
  *B29C 55/02*   (2006.01)
  *B29C 71/02*   (2006.01)
  *B01J 19/06*   (2006.01)
  *B01J 19/18*   (2006.01)
  *C08G 12/34*   (2006.01)
  *B01J 19/00*   (2006.01)
  *B29L 7/00*    (2006.01)

(52) U.S. Cl.
  CPC ............ *C08J 5/18* (2013.01); *B01J 19/0006* (2013.01); *B01J 19/06* (2013.01); *B01J 19/1875* (2013.01); *B29C 55/02* (2013.01); *B29C 71/02* (2013.01); *C08G 12/34* (2013.01); *B01J 2219/00168* (2013.01); *B01J 2219/00186* (2013.01); *B29L 2007/008* (2013.01); *C08J 2361/30* (2013.01)

(58) Field of Classification Search
  None
  See application file for complete search history.

(56) References Cited

U.S. PATENT DOCUMENTS 8,726,829 B2 * 5/2014 Wang ...................... H01L 31/18
                                            118/58

OTHER PUBLICATIONS

Dunne, et al., "Towards scalable and controlled synthesis of metal-organic framework materials using continuous flow reactors", Reaction Chemistry &Engineering, Jun. 23, 2016.
K. S. Novoselov, "A roadmap for graphene", Nature, Oct. 11, 2012, vol. 490, pp. 192-200.
Kissel, P. et al., "A two-dimensional polymer prepared by organic synthesis" Nature Chemistry 4, 287-291, (Feb. 5, 2012).
Kissel, P., Murray, D. J., Wulftange, W. J., Catalano, V. J. & King, B. T, "A nanoporous two-dimensional polymer by single-crystal-to-single-crystal photo polymerization", Nature Chemistry 6, 774-778 (Jul. 27, 2014).
L. Lafferentz et al, "Controlling on-surface polymerization by hierarchical and substrate-directed growth", Nature Chemistry, vol. 4, Mar. 2012, pp. 215-220, Published online Jan. 15, 2010.
Marco Bieri et al., "Porous graphenes: two-dimensional polymer synthesis with atomic precision", Chemical Communications, No. 45, Dec. 7, 2009, pp. 6865-7052.

(Continued)

*Primary Examiner* — Fred M Teskin
(74) *Attorney, Agent, or Firm* — David R. Stevens; Stevens Law Group

(57) ABSTRACT

The present disclosure provides Lazarev reactor that sustains reaction of two dimensional polymerization on the interface of two immiscible solutions A and B carrying components of reaction to the interface where reaction takes place and produces film of two dimensional polymer layers that are pulled out of reactor and rolled up on roll after drying excess of solvent out.

20 Claims, 2 Drawing Sheets

(56) References Cited

OTHER PUBLICATIONS

Sahabudeen et al., "Wafer-sized multifunctional polyimine-based two-dimensional conjugated polymers with high mechanical stiffness", Nature Communications. 7. 13461. 10.1038/ncomms13461, (2016).

Tae Wu Kim et al., "Ultrafast charge transfer coupled with lattice phonons in two-dimensional covalent organic frameworks", Nature Communications (2019) 10:1873, , published online Apr. 23, 2019.

Wei Yang et al., "Epitaxial growth of single-domain graphene on hexagonal boron nitride", Nature Materials, vol. 12, Sep. 2013, pp. 792-797, published only Jul. 14, 2013.

* cited by examiner

LAZAREV REACTOR 1 : PRODUCTION OF FILMS OF TWO-DIMENSIONAL POLYMERS

FIELD OF THE DISCLOSURE

The present disclosure relates generally to process equipment for the production of organic films. More precisely the present invention relates to reactors (Lazarev reactors) for industrial production of two-dimensional polymeric monolayer and two-dimensional polymer multilayer porous polymer films.

BACKGROUND

Two-dimensional polymers that are laterally infinite, one atom- or monomer-unit thin, free-standing, covalent networks with long-range order along two orthogonal directions have attracted intense attention in recent years due to their wide applications in electronics, membrane and sensing (see, Novoselov, K. S. et al., "A roadmap for graphene", Nature 490, 192-200 (2012)). However, the synthesis of graphene involves high-energy procedures, such as chemical vapour deposition (CVD), epitaxial growth and pyrolysis (see, Yang, W. et al., "Epitaxial growth of single-domain graphene on hexagonal boron nitride", Nat. Mater. 12, 792-797 (2013)). The harsh experimental conditions preclude molecular design of graphene on demand. As a first step to rationally synthesize two-dimensional polymers two-dimensional monolayers of porphyrin nanostructures and porous graphene have been constructed on crystalline metal surfaces through Ullmann coupling under ultra-high vacuum conditions (see, Lafferentz, L. et al., "Controlling on-surface polymerization by hierarchical and substrate-directed growth", Nat. Chem. 4, 215-220 (2012) and Bieri, M. et al., "Porous graphenes: two-dimensional polymer synthesis with atomic precision", Chem. Commun. 45, 6919-6921 (2009)). However, the synthesized two-dimensional monolayers are limited to nanometers in size, and their release from original substrate is challenging. As an alternative approach, two-dimensional polymers have been recently achieved through ultraviolet initiated cycloaddition of anthracene-based monomers either in lamellar organic crystals followed by exfoliation into individual layers or at an air-water interface of a Langmuir-Blodgett (LB) (see, Kissel, P. et al., "A two-dimensional polymer prepared by organic synthesis", Nat. Chem. 4, 287-291 (2012), Kissel, P., Murray, D. J., Wulftange, W. J., Catalano, V. J. & King, B. T., "A nanoporous two-dimensional polymer by single-crystal-to-single-crystal photo polymerization", Nat. Chem. 6, 774-778 (2014)). The exfoliation method provides synthetic two-dimension polymers with limited lateral size, typically ranging from a few hundred nanometers to several micrometers, which in the end are determined by crystal sizes. Authors of article (see, Hafeesudeen Sahabudeen, et al., "Wafer-sized multifunctional polyimine-based two-dimensional conjugated polymers with high mechanical stiffness", NATURE COMMUNICATIONS|7:13461|DOI: 10.1038/ncomms13461, pp. 1-8,|www.nature.com/naturecommunications) show the successful preparation of porphyrin containing monolayer and multilayer two-dimensional polymers through Schiff-base poly-condensation reaction at an air-water and liquid-liquid interface, respectively. Both the monolayer and multilayer two-dimensional polymers have crystalline structures as indicated by selected area electron diffraction. The monolayer two-dimensional polymer has a thickness of 0.7 nm with a lateral size of 4-inch wafer, and it has a Young's modulus of 267±30 GPa. Notably, the monolayer two-dimensional polymer functions as an active semiconducting layer in a thin film transistor, while the multilayer two-dimensional polymer from cobalt-porphyrin monomer efficiently catalyzes hydrogen generation from water. This work presents an advance in the synthesis of novel two-dimensional materials for electronics and energy-related applications.

Covalent organic frameworks (COFs) have emerged as a promising light-harvesting module for artificial photosynthesis and photovoltaics. For efficient generation of free charge carriers, the donor-acceptor (D-A) conjugation has been adopted for two-dimensional (2D) COFs recently. In the 2D D-A COFs, photoexcitation would generate a polaron pair, which is a precursor to free charge carriers and has lower binding energy than an exciton. Although the character of the primary excitation species is a key factor in determining optoelectronic properties of a material, excited-state dynamics leading to the creation of a polaron pair have not been investigated yet. Authors of the article (see, Tae Wu Kim et al., "Ultrafast charge transfer coupled with lattice phonons in two-dimensional covalent organic frameworks", NATURE COMMUNICATIONS|(2019) 10:1873|https://doi.org/10.1038/s41467-019-09872-w|www.nature.com/naturecommunications) investigate the dynamics of photo-generated charge carriers in 2D D-A COFs by combining femtosecond optical spectroscopy and non-adiabatic molecular dynamics simulation. From this investigation, authors of this article elucidate that the polaron pair is formed through ultrafast intra-layer hole transfer coupled with coherent vibrations of the 2D lattice, suggesting a mechanism of phonon-assisted charge transfer.

However, the Prior Art discussed above did not present or describe the technological equipment that will allow us to switch to the industrial production of two-dimensional porous polymers. It is within this context that aspects of the present disclosure arise.

SUMMARY

The present disclosure overcomes the marked drawbacks in industrial production of two-dimensional monolayer and multilayer porous polymers based on polymerization of monomeric reagents at the two-dimensional boundary (interface) of two immiscible liquids. These multilayer porous polymer films include films such as crystalline films with vertical alignment intended for organic photovoltaic devices for transforming solar energy into electric energy as well as multilayer porous polymer films for all industrial applications that might benefit from nanoscale porous material, e.g., separation and insulation and energy storage applications.

The present invention provides a reactor, referred to herein as a Lazarev reactor, that sustains reaction of two dimensional polymerization on the interface of two immiscible solutions A and B carrying components of reaction (reagents) to the interface where a reaction takes place that produces a film of two dimensional polymer layers that are pulled out of reactor and rolled up on roll after drying excess of solvent out.

BRIEF DESCRIPTION OF THE DRAWINGS

These and various other features and advantages of the present invention will become better understood upon reading of the following detailed description in conjunction with the accompanying drawings and the appended claims provided below, where:

DETAILED DESCRIPTION

Figure 1:
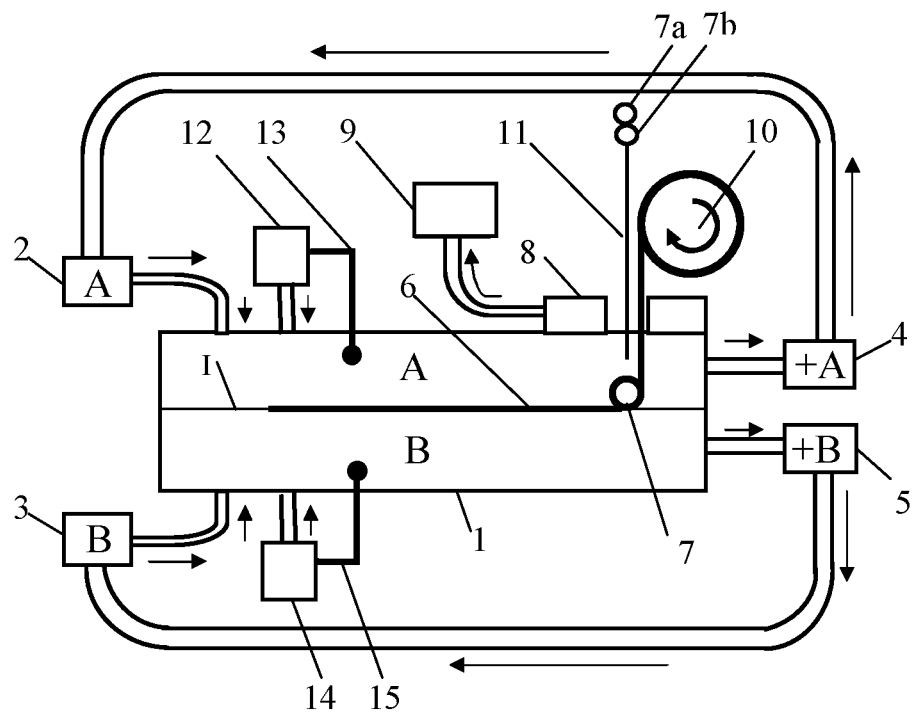
FIG. 1 schematically shows the functional purpose of the main structural elements of the Lazarev chemical reactor according to aspects of the present disclosure.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The general description of the present invention having been made, a further understanding can be obtained by reference to the specific embodiments, which are given herein only for the purpose of illustration and are not intended to limit the scope of the appended claims.

The present disclosure provides a Lazarev reactor that sustains a reaction of two-dimensional polymerization at the interface of two immiscible solutions A and B carrying components of reaction (reagents) to the interface where the reaction takes place and produces a film of two dimensional polymer layers that are pulled out of reactor and rolled up on a roll after drying excess of solvent. A two-dimensional polymer, also known as a Metal Organic Framework, a Covalent Organic Framework, or a Structured Organic Framework, is formed at the interface and the porous structure of the two-dimensional polymer allows reagents to diffuse through the film and form subsequent two-dimensional polymer layers that stack on an initial layer of the two-dimensional polymer. This process continues for an appropriate amount of time and the resulting multilayer two-dimensional polymer structure is one functional film 6 that is removed from reactor by pulling film from interface and rolling it on roll 10 of FIG. 1. By way of example, and not by way of limitation, in the example depicted in FIG. 1, solution A is less dense than solution B and the film 6 forms at the interface I between solutions A and B with solution A above solution B. The film 6 may be removed from the reactor by drawing it up through solution A.

In one implementation, the Lazarev reactor further comprises a freely rotatable roller 7 located inside a reaction vessel and above the interface of two immiscible solutions A and B contained within the reaction vessel. The reaction vessel may be any container with an inside and an outside that can hold solutions A and B within an inside and is preferably unreactive to solutions A or B. The freely rotatable roller controls the horizontal position of the formed two-dimensional polymer film when it moves from the reaction space into a dryer 8 and to a take-up roller 10, the width of the roller 7 is equal or greater than the width of the polymer film 6. The following pairs of solvents may be used for the preparation of immiscible solutions, and the choice of the pairs listed below does not in any way limit the scope of the present disclosure: water-acetonitrile, water-benzol, water-butanol, water-carbon tetrachloride, water-chloroform, water-cyclohexane, water-1,2-dichloroethane, water-ethanol, water-ethylacetate, water-diethyl ether, water-heptane, water-hexane, water-methanol, water-methylethyl ketone, water-tetrahydrofuran, methanol-diethyl ether, methanol-heptane, methanol-hexane, isopropanol-pentane, acetone-heptane, acetone-hexane, acetone-pentane, acetone-isooctane, chloroform-dimethylformamide, chloroform-dimethylsulfoxide, chloroform-methanol.

The reaction vessel 1 and roller 7 may be made of any suitable materials that are resistant to corrosion or dissolving in the solvents used for solutions A and B. Such suitable materials include, but are not limited to, plastics, metals (e.g., stainless steel), glass, and metals coated with glass.

In another embodiment of the present disclosure the Lazarev chemical reactor further comprises units that provide closed-loop circulation of each solution A and B separately for example and without limitation independent pumps, tubing, inlet fittings, and outlet fittings. The inlets and outlets fittings for example and without limitation may be located in areas of the reaction vessel that are substantially covered by solution A or B exclusively. In the examples shown in FIGS. 1 and 2A-2C two independent closed-loop circulation systems are used one for each respective solution. While two independent closed loop circulation systems are shown as aspects of the present disclosure are not so limited and components such pumps, reservoirs or tubes may be shared as long as the solutions are kept separated. In still another embodiment of the disclosed invention the Lazarev chemical reactor further comprises tanks which are used for control of concentration of reagents in solutions A and B and reagents are replenished in these tanks in order to keep concentration of reagents in level that is optimal for the film growth. In yet another embodiment of the disclosed invention the Lazarev chemical reactor further includes an evaporator which removes a steam generated during drying of produced two-dimensional polymer films. In one embodiment of the disclosed invention the Lazarev chemical reactor produces two types of porous two-dimensional polymers: two-dimensional porous monolayer and multilayer porous polymer films. In another embodiment of the disclosed invention the Lazarev chemical reactor produces the chemical reaction at the interface between the components of reaction is carried out due to the bonds selected from list composing covalent, ionic, and coordination bonds. In still another embodiment of the disclosed Lazarev chemical reactor, the solutions A and B contain photovoltaic donor and acceptor reagents necessary for the formation of donor-bridge-acceptor structures at the interface of these solutions, followed by the formation of a two-dimensional polymer film. In yet another embodiment of the present disclosure the Lazarev chemical reactor further comprises containers containing inert substances and viscosity control sensors designed to control and regulate the viscosity of solutions A and B to ensure the laminar flow of these solutions. Examples of inert substances for use in a Lazarev reactor in accordance with aspects of the present disclosure include but are not limited to; polyethylene glycol and other polymers synthesized from the materials of the solvents used in formation of the two-dimensional polymer film. Adjusting the viscosity of solutions A and B will prevent turbulence in the flow of these liquids and, as a result, prevent the formation of defects in the grown two-dimensional polymer film.

FIG. 1 schematically shows the functional purpose of the main structural elements of this reactor. The reaction vessel 1 contains two immiscible solutions A and B, which form an interface I. Solution A contains a monomer reagent of a first type, dissolved in a liquid solvent of the first type. Solution B contains a monomer reagent of a second type, dissolved in a liquid solvent of the second type. First type monomer reagents can dissolve in first type solvents but not second type solvents. Likewise, second type monomer reagents can dissolve in second type solvents but not first type solvents. Solutions A and B are immiscible in that, as is commonly understood, they do not form a homogeneous mixture when added together. Solutions A and B may have different densities such that one solution sits above the other solution and separates out if mixed at reaction pressures and temperatures. As shown in FIG. 1 Solution B is denser than solution A but aspects of the present disclosure are not so limited and either solution may be denser than the other.

A first circulating unit 2 circulates solution A in an upper portion of the reaction vessel 1. Accordingly, a second circulating unit 3 circulates solution B in a lower portion of the reactor vessel 1. Tanks 4 and 5 are used for control of concentration of reagents in solutions A and B and reagents are replenished from these tanks in order to maintain concentration of reagents in solutions A and B at levels that are optimal for growth of the film 6. The formation of the two-dimensional porous polymer film 6 occurs due to the diffusion of monomer reagents from solutions A and B to the interface I of two solutions and the formation of chemical bonds between the mentioned reagents, e.g., covalent bonds, ionic bonds, coordination bonds, and the like.

It should be noted that a reactor of the type described herein allows the formation of multilayer two-dimensional polymers of any length. In this case, each subsequent layer is formed due to the fact that monomer reagents are able to penetrate the pores of previously-formed layers. Each subsequent layer may be oriented relative to the previous layers due to π-π-interaction. By-products of two-dimensional synthesis are filtered during the circulation of solutions. A freely rotatable roller 7 controls horizontal position of the formed two-dimensional polymer film as it moves from the reaction vessel 1 into a dryer 8 and to a take-up roller 10. The roller 7 and take-up roller 10 may be cylindrical with lengths greater than or equal to the desired width of the film 6. Solvent vapor and other vapors generated during drying are removed by the evaporator 9. The dried two-dimensional polymer film 6 is rolled up on the take-up roller 10. The polymer material may be rolled around a spool mounted to the take-up roller. The spool may be made of any material for example and without limitation, cardboard, plastic, or a metal.

The disclosed chemical reactor comprises a container 12 containing inert substances and a viscosity control sensor 13 designed to control and regulate the viscosity of solution A. If solution A uses a polar solvent, such as water, container 12 may introduce polyethylene glycol into the reaction vessel to increase the viscosity of solution A in response to a signal from the viscosity control sensor 13. Similarly, a container 14 containing inert substances and viscosity control sensor 15 is provided for the solution B. By way of example, and not by way of limitation, if solution B uses a non-polar solvent, such as chloroform, container 14 may introduce chlorinated ethylene to increase the viscosity of solution B. By way of example, and not by way of limitation, the viscosity sensors 13 and 15 may be a surface acoustic wave sensor in which an oscillating plate is placed in contact with solution A. The oscillating plate is driven to oscillate laterally at a fixed frequency. Power loss occurring to the solution when the oscillating plate is in contact with to solution can be related to the viscosity of the solution.

FIG. 1 also shows clamping rollers 7a and 7b and a guideline 11 along which these rollers move. The purpose of these clamping rollers is described in detail below and shown in FIGS. 2A-2C.

Figure 2A:
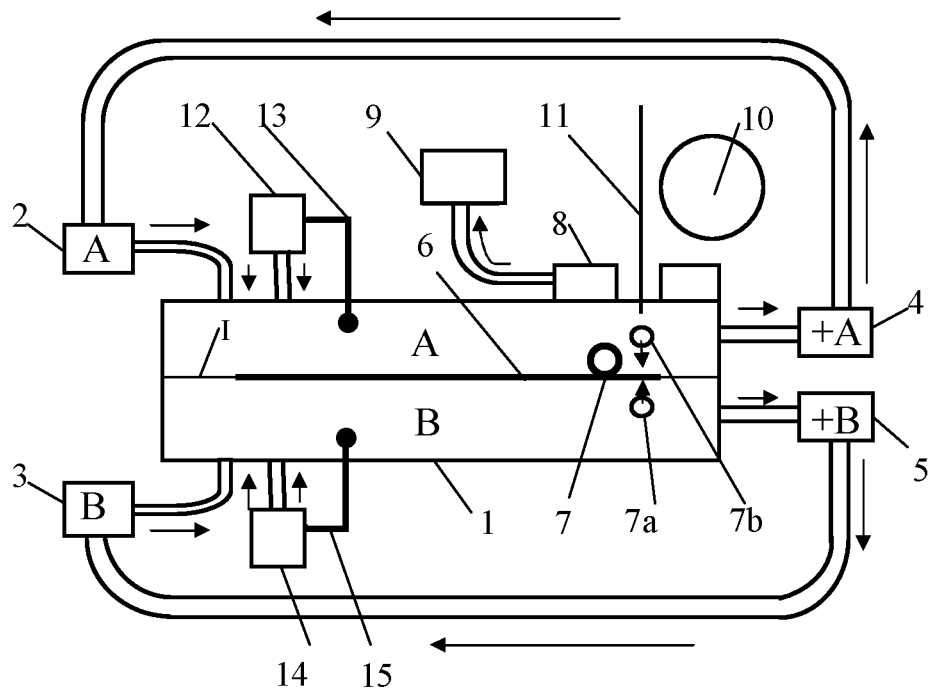
FIGS. 2A-2C schematically show the cross-section of the disclosed Lazarev chemical reactor for illustration several preliminary steps.
Figure 2B:
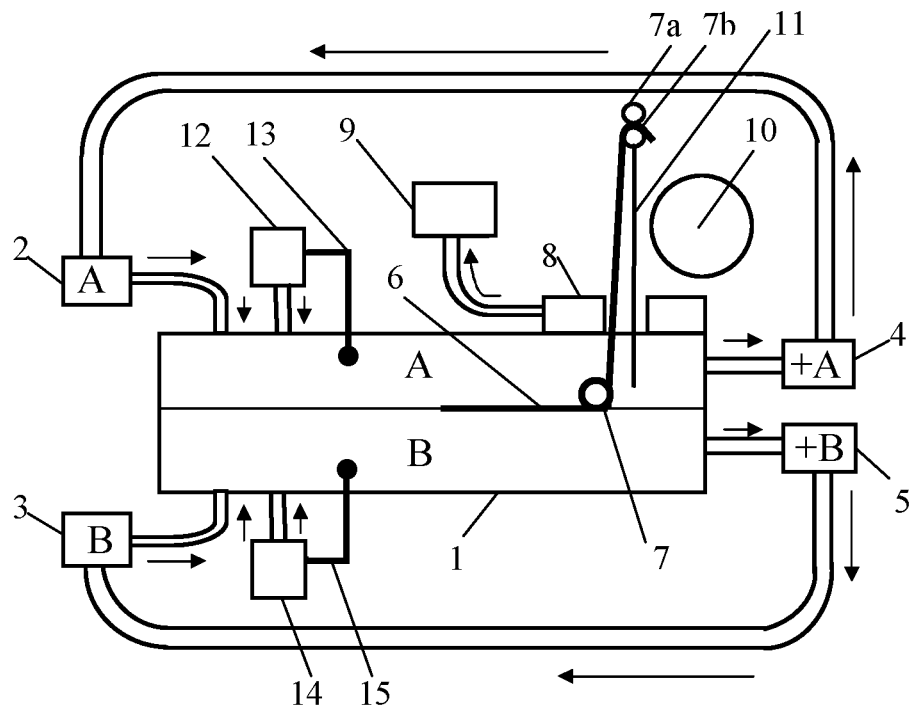
Figure 2C:
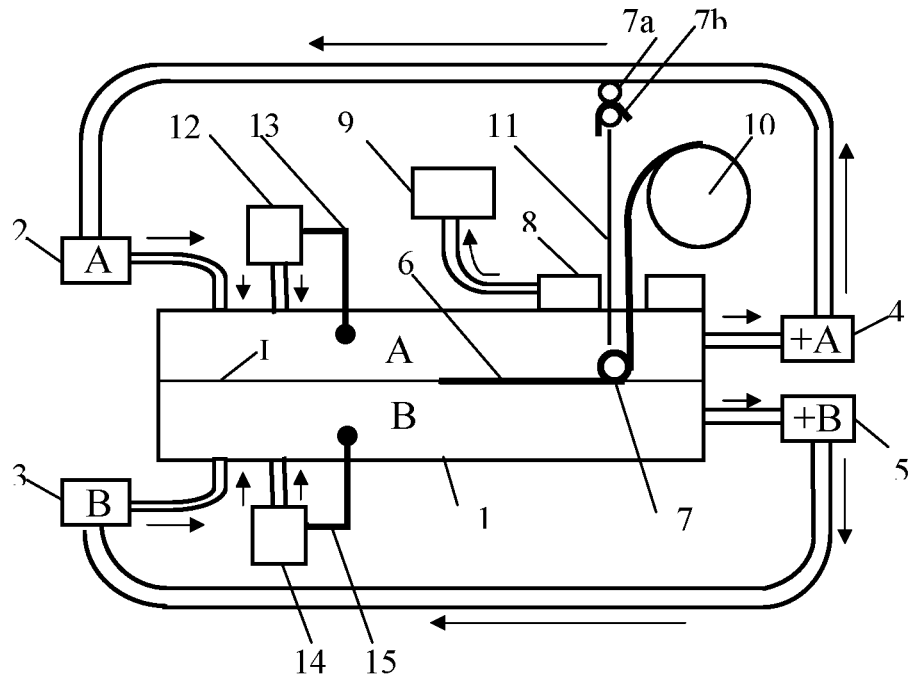

According to aspects of the present disclosure, certain preliminary steps may be performed before starting to make the two-dimensional porous polymer film 6. FIGS. 2A-2A schematically show the cross-section of the disclosed reactor during such preliminary steps. Shown in these drawings clamping rollers 7a and 7b are elements of a mechanism that pulls a leading edge of a preform of the polymer film 6 from the reaction vessel 1 and fixes it to the take-up roller 10. At first, the preform of polymer film 6 is made by an initial reaction at the interface I between solutions A and B, as shown in FIG. 2A. This preform segment serves as a "seed" for further production of polymer film 6. The clamping rollers 7a and 7b are shifted toward each other and compress the edge of the preform as shown in this FIG. 2B. Then the clamping rollers 7a and 7b move vertically together to pull the preform through the drying chamber 8 and raise the edge of the polymer film 6 above the roller 10, as shown in FIG. 2B. At the final stage, the leading edge of the polymer film 6 has been pulled from the reaction vessel 1 and the preform is cut off along a lower edge of the clamping rollers 7a and 7b and then the resulting new leading edge of the billet of film 6 is secured, e.g., with adhesive tape on the take-up roller 10, as shown in FIG. 2C. With the polymer film secured to the take-up roller, the film may be continuously drawn from the Lazarev reactor vessel by rotating the drum.

Two-Dimensional Polymer Film Synthesis Example

In a reactor of the type described herein, it is possible to form a two-dimensional polymer at the interface of chloroform and water in which 5,10,15,20-tetrakis (4-aminophenyl)-21H,23H-porphine (monomer 1) or 5,10,15,20-tetrakis (4-aminophenyl)-21H, 23H-porphyrin-Co(II) (monomer 2) and 2,5-dihydroxyterephthalaldehyde (monomer 3) are dissolved, respectively.

The width of the film produced by reaction at the interface may be controlled by the width of reactor vessel in which solutions A and B interface with each other and allow a two dimensional polymerization reaction to take place. Width might be controlled by inserts that are positioned on the sides of reactor proximate the interface I and restrict the width of the interface I to a width that is less than or equal to the width of the roller 7. Such inserts may be repositioned laterally as required to meet specifications for the width of the target product made from the two-dimensional polymer film 6. Widths ranging from a few centimeters, e.g., 2 to 100 centimeters, to a few meters, e.g., 1 to 10 meters, are envisaged although larger or smaller films are within the scope of the present disclosure.

Growth of thickness of the film 6 depends on the rate of diffusion of reagents to the interface of reaction. The thickness of the film may be therefore be controlled by controlling the time that the film 6 is allowed to be at the interface I of solutions A and B. Other factors that affect film thickness include speed of removal of the film 6 from the reaction vessel 1, e.g., the rate of rotation of the take-up roller 10, and the size of pores in the two-dimensional polymer film 6, which can affect the speed of diffusion of reactants.

The length of the film 6 may be arbitrary and limited mainly by the capacity of the roller 10, which depends partly on the film thickness, and the availability of reactants for solutions A and B. Films of several tens of meters to several hundreds of meters or even several thousands of meters are envisaged.

Lazarev chemical reactors as described herein allow for industrial production of two-dimensional polymeric monolayer and two-dimensional polymer multilayer porous polymer films for organic photovoltaic devices intended for transforming solar energy into electric energy. Lazarev chemical reactors according to aspects of the present disclosure may also be used in manufacturing of films for industrial applications outside of photovoltaic devices. Examples of such applications include, but are not limited to, production of two-dimensional polymer films for the food and chemical industries for separation and filtration purposes as well as gas separation and gas storage, as well as electric insulation and electric energy storage. Applications of Lazarev reactors and the two-dimensional polymer films they produce are not limited to these applications. Although implementations described herein involve formation of a single film at a single interface between two solutions, it is conceivable for a Lazarev reactor to be configured to use three or more solutions of different densities resulting in two or more interfaces with different reactions taking place at each interface thereby producing two or more films for lamination outside the reactor.

Although aspects of the present disclosure have been described in detail with reference to a certain implementations, persons possessing ordinary skill in the art to which this disclosure pertains will appreciate that various modifications and enhancements may be made without departing from the spirit and scope of the claims that follow. Any feature, whether preferred or not may be combined with any other feature whether preferred or not. It should be understood that various alternatives to the embodiments of the invention described herein can be employed in practicing the invention. It is intended that the following claims define the scope of the invention and that methods and structures within the scope of these claims and their equivalents be covered thereby. The appended claims are not to be interpreted as including means-plus-function limitations, unless such a limitation is explicitly recited in a given claim using the phrase "means for."

What is claimed is:

1. A chemical reactor comprising:
   a reaction vessel having an inside and an outside;
   a roller located inside of the reaction vessel configured to draw a two-dimensional polymer film material out from a fluid interface of a first solution and a second solution; and
   clamping rollers configured to clamp onto a preform of the polymer film and pull the preform of the polymer film through a drying chamber and raise the edge of the polymer film above the roller.

2. The chemical reactor of claim 1 wherein a depth of the roller inside the reaction vessel is chosen to be the depth of the fluid interface.

3. The chemical reactor of claim 1 further comprising a first liquid circulation loop and a second liquid circulation loop, wherein the first liquid circulation loop is configured to circulate the first solution through the inside of the reaction vessel and the second liquid circulation loop is configured to circulate the second solution through the inside of the reaction vessel and wherein the first and second liquid circulation loops operate separately from one another.

4. The chemical reactor of claim 1 further comprising a first container coupled to the reaction vessel and a second container coupled to the reaction vessel, wherein the first container is configured to hold the first solution and the second container is configured to hold the second solution.

5. The chemical reactor of claim 1, further comprising an evaporator configured to remove solvent vapor.

6. The chemical reactor of claim 1 further comprising viscosity regulation containers and viscosity sensors coupled to the reaction vessel, wherein the viscosity regulation containers are configured to contain inert substances and configured to add the inert substances to the reaction vessel to regulate the viscosity of the first solution or the second solution ensuring laminar flow of the first and second solutions based on information from the viscosity sensors.

7. The chemical reactor of claim 1 further comprising a take-up roller configured to pull the polymer film past the roller and roll the polymer film onto a spool.

8. A method for creating a polymer film material comprising:
   reacting a first solution and a second solution, wherein the first and second solution are immiscible to each other, wherein the first solution includes a first reactant and the second solution includes a second reactant wherein the first reactant and second reactant are selected to generate a polymerization reaction in at least two dimensions when in contact with each other;
   contacting a polymerized material formed at a fluid interface of the first and second solution with a roller; and
   using the roller to draw the polymerized material out from the fluid interface into a two-dimensional polymer film material.

9. The method of claim 8, wherein the first solution and second solution is a pair of solutions selected from: water-acetonitrile, water-benzene, water-butanol, water-carbon tetrachloride, water-chloroform, water-cyclohexane, water-1, 2-dichloroethane, water-ethanol, water-ethylacetate, water-diethyl ether, water-heptane, water-hexane, water-methanol, water-methylethyl ketone, water-tetrahydrofuran, methanol-diethyl ether, methanol-heptane, methanol-hexane, isopropanol-pentane, acetone-heptane, acetone-hexane, acetone-pentane, acetone-isooctane, chloroform-dimethylformamide, chloroform-dimethylsulfoxide, or chloroform-methanol.

10. The method of claim 8, wherein the polymer film material is a two-dimensional multilayer porous polymer film.

11. The method of claim 8, further comprising drying the polymer film material and evaporating the solvent vapor generated during drying of the polymer film material with an evaporator.

12. The method of claim 11, further comprising using a pair of clamping rollers to pull a preform of the polymer film through a drying chamber and raise the edge of the polymer film above the roller.

13. The method of claim 8, wherein the chemical reaction at the interface between the components of reaction is carried out due to the bonds selected from list composing covalent, ionic, and coordination bonds.

14. The method of claim 8, wherein the first solution and second solution contain photovoltaic donor and acceptor respectively reagents necessary for the formation of donor-bridge-acceptor structures at the interface of these solutions, followed by the formation of a two-dimensional polymer film.

15. The method of claim 8, further comprising measuring the viscosity of the first and second solutions and adding inert substances to the reaction regulating the viscosity of the first or second solution to ensure the laminar flow of the first and second solutions based on the viscosity measurement.

16. The method of claim 8, further comprising, pulling the polymer film material from the roller with a take-up roller and using the take-up roller to wind the polymer film material onto a spool.

17. The method of claim 8, wherein the first reactant includes 5,10,15,20-tetrakis (4-aminophenyl)-21H,23H-porphine and the second reactant includes 2,5-dihydroxyterephthalaldehyde.

18. The method of claim 8, wherein the polymerized material includes a crystalline films.

19. A chemical reactor comprising:
a reaction vessel having an inside and an outside;
a roller located inside of the reaction vessel configured to draw a two-dimensional polymer film material out from a fluid interface of a first solution and a second solution;
viscosity sensors coupled to the reaction vessel; and
viscosity regulation containers coupled to the reaction vessel, configured to contain inert substances, and configured to add the inert substances to the reaction vessel to regulate at least one of: the viscosity of the first solution or the viscosity of the second solution, ensuring, based on information from the viscosity sensors, laminar flow of the first solution and laminar flow of the second solution.

20. The chemical reactor of claim 19, further comprising:
a dryer configured to dry the polymer film; and
an evaporator configured to remove solvent vapor that is generated during drying the polymer film material.

\* \* \* \* \*